Patented Apr. 1, 1941

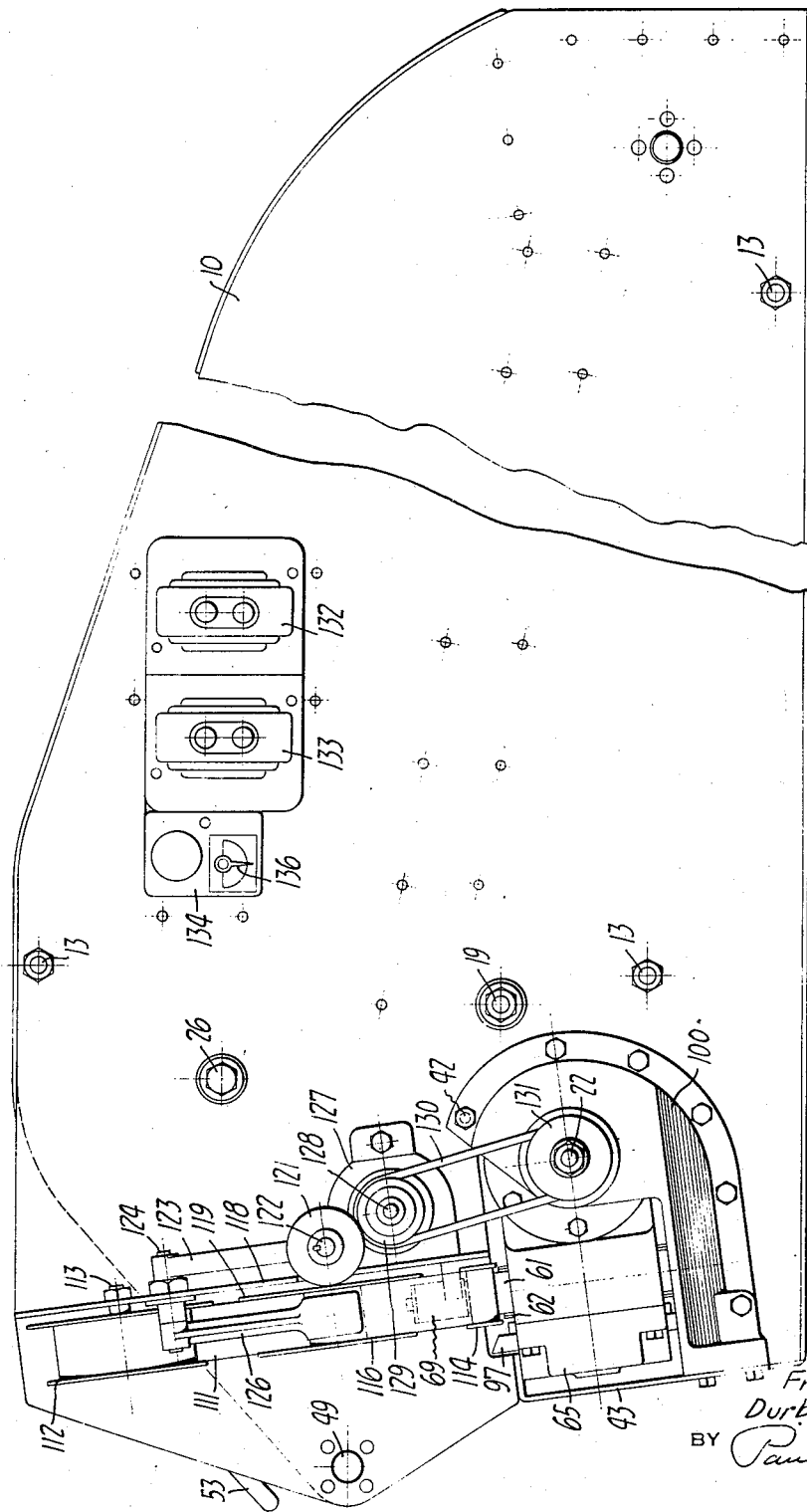

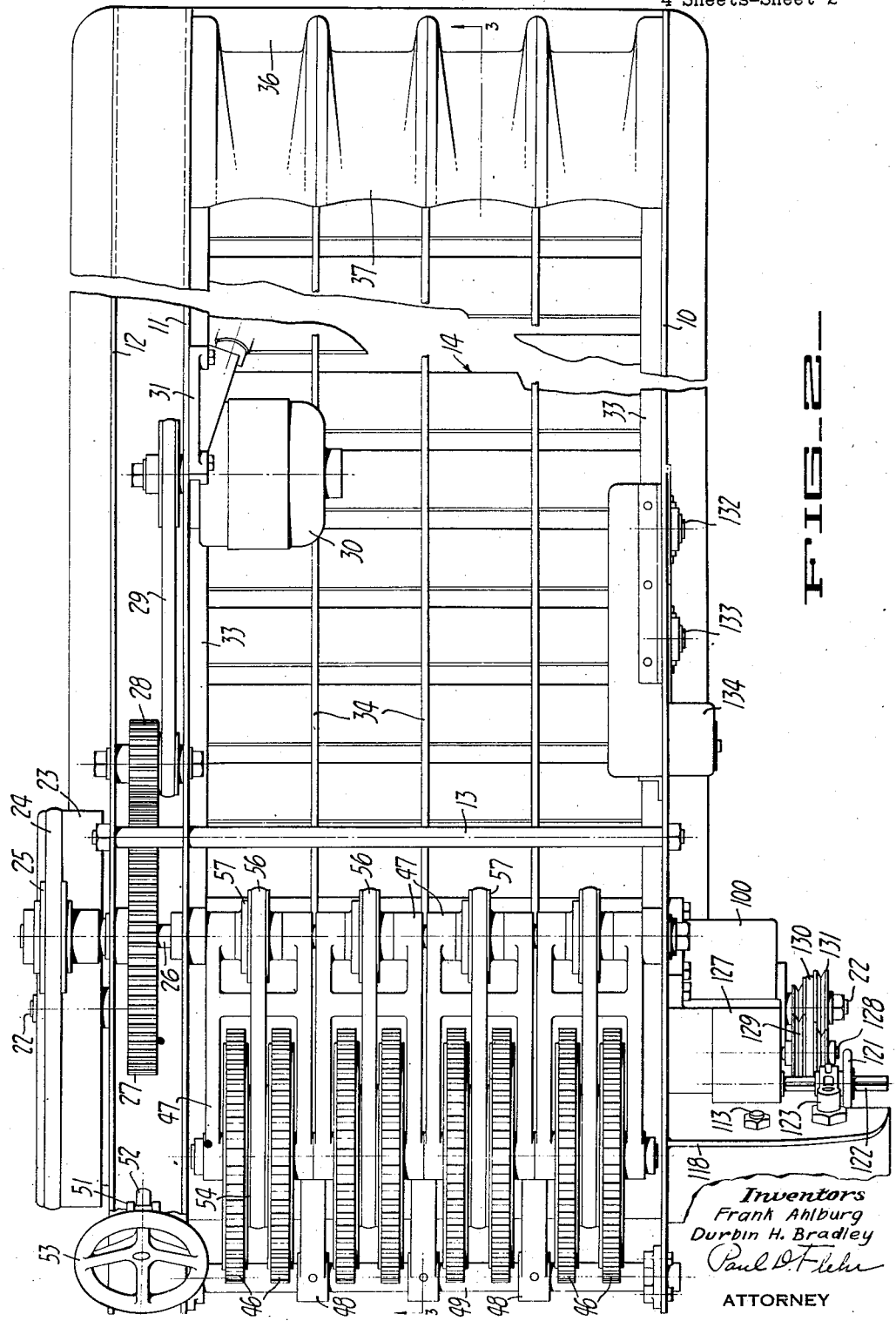

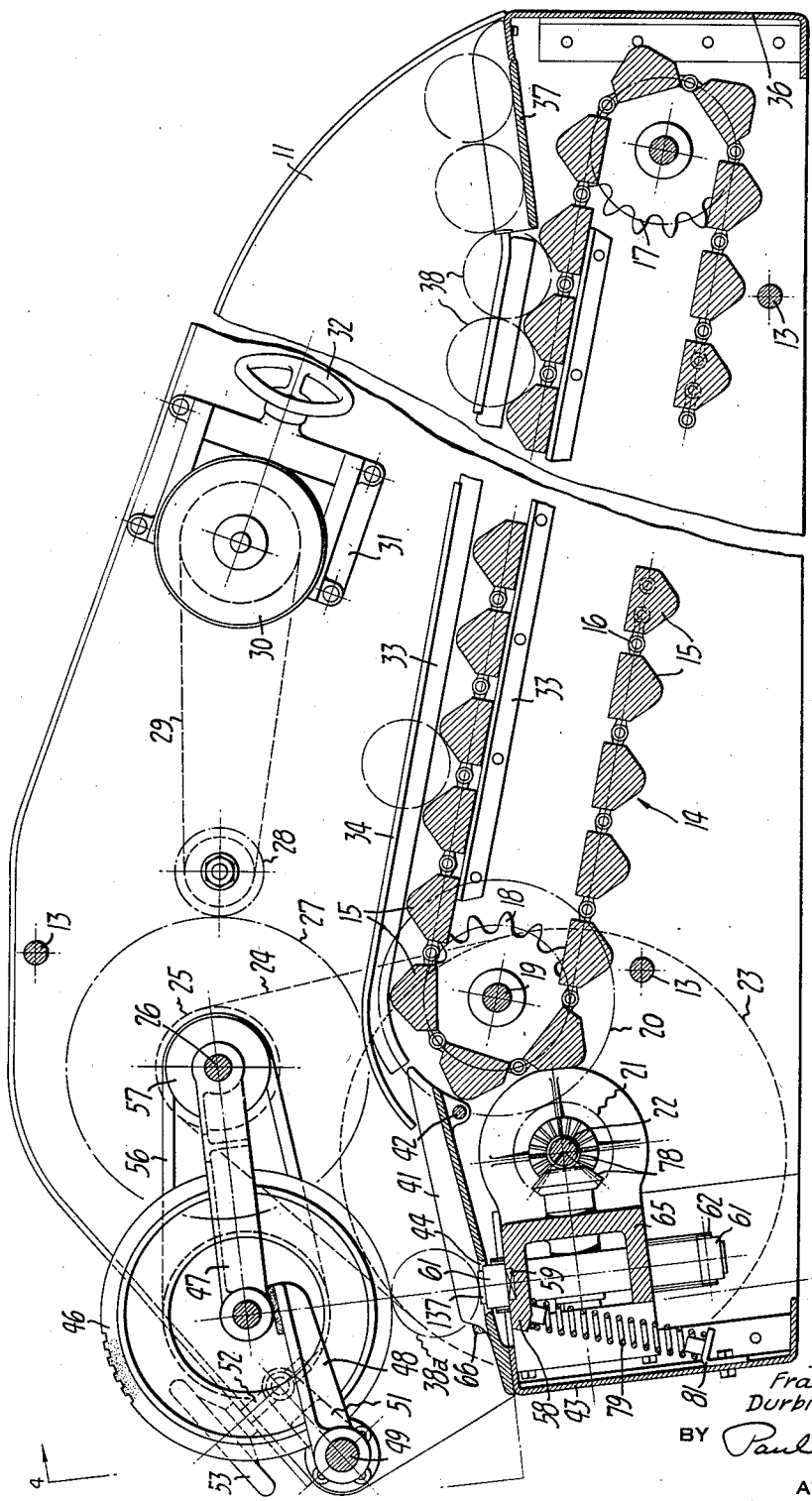

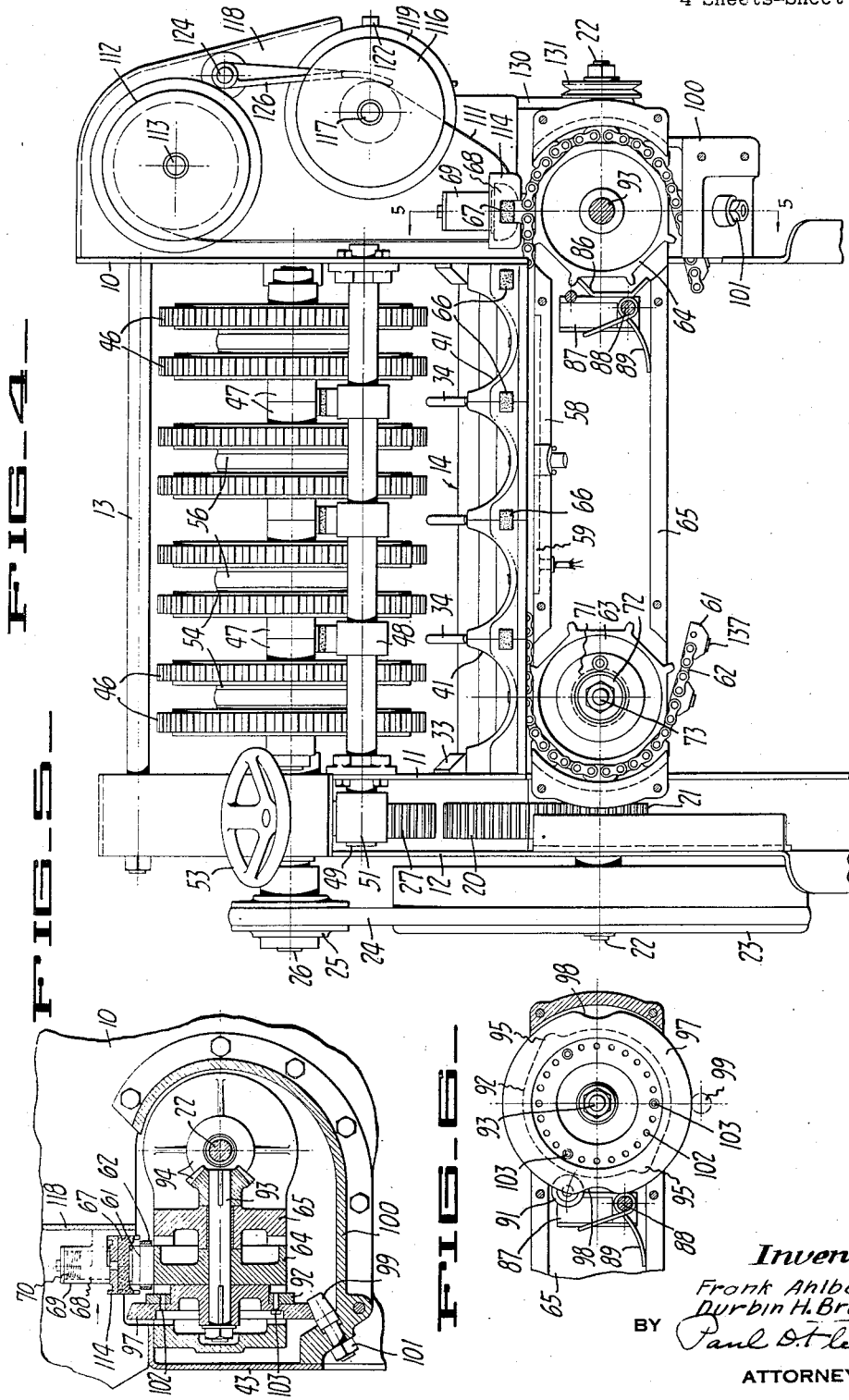

2,236,740

UNITED STATES PATENT OFFICE 2,236,740

FRUIT MARKING MACHINE

Frank Ahlburg and Durbin H. Bradley, Los Angeles, Calif., assignors to American Fruit Growers, Incorporated, Los Angeles, Calif., a corporation of Delaware Application February 12, 1940, Serial No. 318,547

11 Claims. (Cl. 101—40)

Our invention relates to machines of the character commonly employed for marking fruits such as oranges, grapefruit or the like with brand names and is concerned more particularly with a machine of the character referred to in which a plurality of rows of fruit can be marked in an automatic manner.

It is a general object of the invention to provide an improved fruit marking machine of a simple, economical and efficient construction.

Another general object of the invention is to provide a fruit marking machine of the character referred to in which the inking mechanism is located in an accessible position away from the debris occasioned from the marking operation.

Another object of the invention is to provide a machine of the character referred to in which a single source of ink can be used for a series of marking stations.

Other objects and advantages of the invention will be apparent from the following description of a preferred embodiment as illustrated in the accompanying drawings, in which:

Figure 1 is a side elevational view of a fruit marking machine embodying the instant invention.

Figure 2 is a plan view of the machine shown in Figure 1.

Figure 3 is a longitudinal sectional view taken in a plane indicated by the line 3—3 in Figure 2.

Figure 4 is a rear elevational view of the machine with certain parts omitted as indicated by the line 4—4 in Figure 3.

Figure 5 is a detail sectional view taken in a plane indicated by the line 5—5 in Figure 4, and Figure 6 is a detail view taken as indicated by the line 6—6 in Figure 5.

As explained generally above the instant invention pertains to that class of fruit marking machine adapted to mark brand names or other suitable indicia on fruits such as oranges, grapefruit and the like, and this is usually accomplished by means of a heated marking die from which the marking ink is applied to the fruit. The machine is adapted to receive indiscriminately arranged fruit and to arrange it in rows for progression past a row of marking stations where each piece of fruit has a hot marking die applied thereto. One primary difficulty in known fruit marking machines of this character has been caused by the location of inking ribbons for the respective marking dies beneath the path of the fruit so that debris from any broken fruit would collect in the inking mechanism and cause deterioration thereof, sometimes to the point of becoming unsuitable for further use. Furthermore, the inaccessible locations of such mechanism have complicated service and repair, as well as making inspection thereof difficult.

In accordance with the instant invention these difficulties have been eliminated and the inking mechanism has been disposed in an accessible and convenient location where it is not easily fouled. At the same time a single source of marking ink is utilized for supplying ink to a plurality of marking stations.

Referring to Figs. 1, 2 and 4, the frame of the machine includes left side plate 10 and a pair of spaced-apart right side plates 11 and 12, all secured together by suitable transverse tie rods or spacers 13. Between the side plates 10 and 11, a fruit conveyor indicated generally at 14 is provided comprising a series of transverse bars 15 suitably secured between respective chains 16. Chains 16 are trained around respective idler sprockets 17 and drive sprockets 18 carried by transverse shaft 19. Shaft 19 is suitably journalled in side plates 10 and 11 and carries gear 20 meshing with gear 21 on a transverse drive shaft 22 referred to hereinafter. Shaft 22 (Figs. 2, 3 and 4) carries large pulley 23 connected by a belt 24 with pulley 25 on a drive shaft 26 (Fig. 2). Shaft 26 carries gear 27 meshing with gear 28 suitably journalled between plates 11 and 12 and connected by a conventional form of variable speed belt and pulley mechanism 29 with the drive shaft of electric motor 30. To control the speed drive motor 30 may be mounted for sliding movement on ways 31 mounted on side plate 11. The sliding movement of motor 30 may be controlled by handwheel 32.

The upper run of conveyor bars 15 (Fig. 3) is guided and supported by suitable angles 33 secured to respective side plates 10 and 11.

The transverse space across the conveyor 14 (Figs. 2 and 3) is divided by a plurality of longitudinal separating bars 34 to provide four parallel paths of travel for fruit which are suitably supported on and extend from transverse frame plate 36 at the feed end of the machine to troughs 41 at the marking stations referred to hereinafter. At the feed end of the conveyor, a transverse row of trough-like feed members 37 is provided which are suitably pivoted on transverse plate 36 at their front ends and have their rearward ends resting on the bars 15 of the conveyor to rise and fall as the bars pass therebeneath. The rising and falling of feed members 37 facilitates feeding of fruit such as indicated at 38 to the conveyor without crowding.

The rows of fruit carried by the conveyor 14 are discharged therefrom to respective marking stations formed in part by troughs 41. Each trough 41 (Figs. 3 and 4) has one end secured on transverse rod 42 and the other end mounted on rear transverse plate 43 of the frame. Each trough 41 is apertured at 44 to provide a marking station through which an aligned marking die 61 can engage the fruit, as later described. Above each opening 44 there is a pair of resilient feeding wheels 46 of conventional construction. Each pair of wheels 46 are journalled in an arm 47 which is suitably pivoted about transverse drive shaft 26 and supported at its outer ends by adjustable arm 48 secured on transverse shaft 49. To adjust shaft 49 and arms 38, and thereby adjust the vertical height of the feed wheels 46, the shaft 49 carries an arm 51 (Fig. 3) having a suitable nut engaged by an adjusting screw 52 having a handle 53. Each pair of rollers 46 carries a grooved pulley 54 driven by belt 56 from an aligned pulley 57 on the shaft 26.

As previously explained, the inclined guide troughs 41 at the transverse row of marking stations have apertures 44 therein past which the respective rows of fruit are fed as they pass under feed wheels 46 associated therewith. The transverse row of marking stations has associated therewith an endless series of marking dies 61 (Fig. 4) carried by chains means 62 extending about driving sprocket 63 and control sprocket 64, which are carried by die frame 65. Die frame 65 is provided with a track support 58 for the upper stretch of the dies and an electrical heating element 59 of conventional construction is mounted on such support. As will be explained, series of marking dies are advanced in step-by-step fashion and in timed relation with such step-by-step movement, die frame 65 has a vertical oscillation so that uppermost stretch of dies 61 are raised and lowered into and out of the apertures 44. Each step of movement of a marking die is equal to one-half the space between the respective marking stations. Between each adjacent pair of guide and marking troughs 41 an inking pad 66 of suitable resilient material such as sponge rubber is mounted with its lower surface adapted for engagement by a die in the raised position of the die frame 65. At the feed end of the chain a master inking pad 67 of similar construction is provided. Pad 67 is secured on a plunger 68 mounted for limited endwise movement in a cylinder 69 and urged downwardly by a spring 70 seated in the cylinder. The arrangement is such that the ink picked up by engagement of the dies with the pad 67 will be carried transversely across the machine to the pads 66 spaced along the path of travel.

The step-by-step drive for the series of inking dies 61 (Figs. 3, 4 and 5) may be effected in the following manner. The driving sprocket 63 is connected by spirally wound spring 71 of conventional construction with its hub 72. Hub 72 is carried on a shaft 73 suitably journalled in die supporting frame 65 which is pivotally supported on transverse drive shaft 22. Shaft 73 has a bevel gear connection 78 with shaft 22. The weight of frame 65 is counterbalanced in part by spring 79 extending between the outer edge of frame 65 and the bracket 81 of rear plate 43.

The step-by-step movement of dies 61 is controlled by an escapement mechanism including a pawl 86 carried by a frame 87 pivoted at 88 on the die supporting frame 65 and spring-urged in a clockwise direction as viewed in Figure 4 by spring 89. The upper tooth of pawl 86 normally engages a tooth of the sprocket 64 and prevents movement thereof of die chain 62 whereby the spring 71 will be wound up by shaft 73 which rotates constantly during machine operation.

Cam means are provided for periodically releasing the pawl 86 to enable a one-step movement of the series of dies 61. Referring to Figure 6, the pawl frame 87 carries a roller 91 for cooperative relation with a cam disc 92 secured on shaft 93. Shaft 93 also has a bevel gear connection 94 (Fig. 5) with drive shaft 22 so that it is driven in time with the movement of drive shaft 73 for driving sprocket 63. The cam disc 92 has two cam rises 95 spaced 180° apart so that twice during each rotation pawl 86 will be moved out of its holding position illustrated in Figure 4. The pawl 86 operates in the same manner as the conventional escapement pawl of a watch movement to limit the movement of the ratchet wheel 64 and the series of dies 61 to one step. Thus, as one of cam rises 94 engages the roller 91 and releases the pawl 86, spring 71 can become effective to snap the chain forward for a distance equal to one tooth space of ratchet 64, which is also the distance between a pad 66 and the adjacent opening 44 of a marking station.

The forward movement of the marking dies is accomplished in timed relation to the vertical reciprocation thereof with pawl 86 and while the dies are in their lowest position out of the apertures 44. To control the vertical movement of frame 65 and the marking dies supported thereon the cam disc 92 is connected to a second cam disc 97 having a pair of diametrically opposite cam depressions 98. The cam disc 97 rides upon a tapered roller 99 adjustably mounted for endwise movement in bracket 100 on side plate 10 by adjusting screw 101. Thus, each time the roller 99 enters a depression 98 of cam 97 the frame 65 will fall by gravity against the spring 79 to remove dies 61 from apertures 44 in the troughs 41 to be free for transverse movement. By adjusting the tapered roller 99 the amount of travel of the frame 65 in its vertical oscillation can be adjusted to the desired extent so that dies 61 will project through apertures 44 of the marking station.

A timed relation is provided between the vertical oscillation and the step-by-step movement of the marking dies 61, and for this purpose the cam discs 92 and 97 may be individually provided with a series of equally spaced apertures 102 (Fig. 6) with the spacing different from each disc. The selective alignment of successive pairs of apertures to receive fastening screws 103 will result in relative rotative adjustment between the cam discs, whereby the timing of cam depression 98 of disc 97 and cam rises 94 of disc 92 can be relatively adjusted.

Means are provided for supplying ink to the master inking pad 67 by means of an inking ribbon having a constant speed of travel irrespective of the amount wound on the driving reel therefor. As shown in Fig. 4 the inking ribbon 111 extends from reel 112 on shaft 113 beneath plunger 68 and between guides 114 depending from cylinder 69. The ribbon then extends to driving reel 116 upon which it is wound. Reel 116 is secured in shaft 117 suitably mounted on bracket 118 extending outwardly from the side frame plate 10. Reel 116 has an enlarged rear face forming the driving disc 119 of a convenient variable speed friction drive assembly. Driving roller 121 (Fig. 1) of the assembly has a sliding driving engagement with a drive shaft 122, and its radial position with respect to disc 119 is controlled by arm 123 engaged therewith and secured on shaft 124. Shaft 124 carries a depending feeler arm 126 (Fig. 4) engaging the ribbon wound on the reel 116. Shaft 122 has a geared connection in gear box 127 (Fig. 1) with shaft 128. Shaft 128 carries a pulley 129 driven through belt 130 from pulley 131 on shaft 22. Thus, the position of driving roller 121 is automatically varied with respect to the driving disc 119 in accordance with the amount of inking ribbon wound on the reel 116, so that the travel of the inking ribbon is maintained constant irrespective of the changing diameter of the wound position thereof on reel 116.

*Operation.*—To start operation switch 132 (Fig. 1) is operated to start the motor 30 and thereby enable the drive for all of the parts. Heating element 59 is turned on by operation of switch 133. Associated with the switch 133 is an automatic thermostat control 134 of conventional construction by means of which the temperature of the heating element is automatically maintained at the proper temperature as adjusted by the control pointer 136 of the thermostat.

When the marking dies 61 are at the proper temperature the fruit to be marked is fed by suitable means, such as a conveyor, over the feed troughs 37 onto the conveyor 14 so that four rows of fruit will be elevated thereby and fed to the respective marking stations. It will be noted that because of the geared connection between conveyor drive shaft 19 and drive shaft 22 for the dies, the feed of the fruit is in timed relation to the operation of the marking dies, the timing being such that as a piece of fruit reaches a station indicated at 38a in Figure 3, a marking die 61 is in the elevated position shown projecting through the opening 44 of the station. In effect a piece of fruit is rolled over a die lengthwise of the raised portion 137 thereof forming the name or other indicia to be imprinted on the fruit and is then discharged from the machine.

Between the time one piece of fruit is discharged from a marking station and another is delivered thereto, the die frame 65 is lowered by the engagement of the depression 98 of the cam disc 97 with the roller 99. While the die frame is lowered the escapement pawl 86 is released by a cam rise 96 so that the driving sprocket 63 can become effective to advance a die from a marking station to the next adjacent inking pad or station 66 and vice versa. It will be noted that the master inking pad 67 is a one-step space from the first pad 66. Ink from the initial pad 67 is carried across to the other pads 66 by the marking dies themselves and the pads absorb excess ink from the dies. It has been found in actual operation that the pads 66 will accumulate enough ink to continue marking fruit successfully for a period in the order of fifteen minutes after the inking ribbon 111 has completed its feed so that no additional supply of ink is available. Thus, ample time is afforded to re-wind or replace the inking ribbon without stopping operation of the machine.

We claim:

1. In a fruit marking machine, a row of marking stations, a row of inking pads disposed alternately with respect to said stations and substantially equally spaced with respect thereto, an endless series of marking dies having a path of travel extending along said stations, means for driving said dies in step-by-step fashion along said rows to effect alternate alignment of a die with a pad and then with a station, means for intermittently raising and lowering said dies in timed relation to the step-by-step travel thereof, and means for feeding fruit to said marking stations.

2. In a fruit marking machine having a row of marking stations and means for feeding fruit to said stations, a row of inking pads disposed alternately with respect to said stations and substantially equally spaced with respect thereto, a marking die having a path of travel extending along said stations, means for driving said die in step-by-step fashion along said rows to effect alternate alignment thereof with a pad and then with a station, and means for intermittently raising and lowering said die in timed relation to the step-by-step travel thereof.

3. In a fruit marking machine, a row of marking stations, means for progressing rows of fruit transversely of said row of marking stations whereby each row of fruit traverses a marking station, a row of inking stations disposed alternately with respect to said marking stations and substantially equally spaced with respect thereto, an endless series of marking dies having a path of travel extending along said stations, means for effecting step-by-step movement of said dies along said stations, said die moving means and said fruit progressing means operating in a timed relation, and means for feeding marking ink to said dies in a location ahead of their travel along said stations, whereby said dies carry marking ink to said inking stations.

4. In a fruit marking machine, a row of marking stations, means for feeding fruit across each marking station in a direction transverse to said row of marking stations, a row of inking stations disposed alternately with respect to said marking stations and substantially equally spaced with respect thereto, one or more marking dies having a path of travel extending along said stations, means for feeding said dies from station to station, and means for feeding marking ink to said dies in a location ahead of their travel along said stations, whereby said dies carry marking ink to said inking stations.

5. In a fruit marking machine having a row of marking stations and means for feeding fruit to said stations, a row of inking pads disposed alternately with respect to said stations and substantially equally spaced with respect thereto, a die frame mounted for vertical oscillatory movement below said stations, an endless series of marking dies having a path of travel about said die frame, said die frame including an upper surface for supporting said dies and means for heating said surface, means for driving said dies in step-by-step fashion to effect alternate alignment of a die with a pad and then with a station, and means for intermittently raising and lowering said die frame in timed relation to the step-by-step travel of said dies thereabout.

6. In a fruit marking machine having a row of marking stations and means for feeding fruit to said stations, a row of inking pads disposed alternately with respect to said stations and substantially equally spaced with respect thereto, a die frame mounted for vertical oscillatory movement below said stations, an endless series of marking dies having a path of travel about said die frame, said die frame including an upper surface for supporting said dies and means for heating said surface, means for driving said series of dies in step-by-step fashion to effect alternate alignment of a die with a pad and then with a station, means for intermittently raising and lowering said die frame in timed relation to the step-by-step travel of said dies thereabout, and a master inking pad disposed in a location ahead of said first-named pads and said marking stations in the direction of travel thereof for feeding marking ink to said dies to be carried thereby to said inking pads.

7. In a fruit marking machine, a row of marking stations, means for feeding fruit across each marking station in a direction transverse to said row of marking stations, a row of inking stations disposed alternately with respect to said marking stations and substantially equally spaced with respect thereto, an endless series of marking dies having a path of travel extending along said stations, means for effecting feeding movement of said dies in step-by-step fashion from station to station, and a master inking station spaced ahead of the initial one of said row of inking stations for a distance equal to one-step movement of said dies.

8. In a fruit marking machine, a plurality of marking stations, means for feeding fruit across each marking station in a direction transverse to said row of marking stations, a plurality of inking stations associated with said marking stations, a plurality of marking dies movable to receive ink from said inking stations and thereafter mark fruit in said marking stations, and means for feeding marking ink to said dies for transmission thereby to said inking stations.

9. In a fruit marking machine, a plurality of marking stations, each station comprising a fruit receiving trough having an aperture in the bottom wall thereof, a plurality of inking stations arranged in alternate relation with respect to said marking stations, a plurality of marking dies movable to receive ink from said inking stations and thereafter being adapted to project through said apertures to mark fruit in said marking stations, and means for feeding marking ink to said dies for transmission thereby to said inking stations.

10. In a fruit marking machine, a row of marking stations, each station comprising a fruit receiving trough having an aperture in the bottom wall thereof, means for rolling fruit along said troughs, a row of inking stations disposed alternately with respect to said marking stations and substantially equally spaced with respect thereto, an endless series of marking dies connected together for simultaneous travel through a path extending along said stations, means for effecting feeding movement of said dies in step-by-step fashion from station to station, whereby each of said dies first contacts one of said inking stations and then is disposed in the aperture of the adjacent marking station, and a master inking station spaced ahead of the initial one of said row of inking stations for cooperation with said dies to feed ink by said dies to said inking stations.

11. In a fruit marking machine, a row of marking stations, each station comprising a trough extending transversely of the row of stations, said trough having an aperture in the bottom wall thereof, means for receiving indiscriminately arranged fruit and segregating it into rows and for progressing said rows through said respective troughs, a row of inking stations disposed alternately with respect to said marking stations and substantially equally spaced with respect thereto, an endless series of marking dies having a path of travel extending along said stations, means for effecting feeding movement of said dies in step-by-step fashion from station to station, and a master inking station spaced ahead of the initial one of said row of inking stations for cooperation with said dies to feed ink by means of said dies to said inking stations.

FRANK AHLBURG.
DURBIN H. BRADLEY.